US009853371B2

(12) United States Patent
Forsyth

(10) Patent No.: US 9,853,371 B2
(45) Date of Patent: Dec. 26, 2017

(54) BRAZED GROUND TERMINAL FOR NON-FERROUS VEHICLE COMPONENTS

(71) Applicant: Ford Motor Company, Dearborn, MI (US)

(72) Inventor: Matthew Forsyth, Detroit, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 240 days.

(21) Appl. No.: 14/634,950

(22) Filed: Mar. 2, 2015

(65) Prior Publication Data

US 2016/0261071 A1 Sep. 8, 2016

(51) Int. Cl.

*B23K 1/00* (2006.01)
*B23K 9/20* (2006.01)
*H01R 4/66* (2006.01)
*H01R 4/64* (2006.01)
*H01R 43/02* (2006.01)
*H01R 4/02* (2006.01)

(52) U.S. Cl.

CPC ............... *H01R 4/646* (2013.01); *H01R 4/66* (2013.01); *H01R 43/02* (2013.01); *H01R 4/023* (2013.01); *H01R 43/0214* (2013.01); *H01R 2201/26* (2013.01)

(58) Field of Classification Search

CPC ................ B23K 9/207; B23K 20/1295; B23K 35/0288; B23K 1/00; H01R 4/646; H01R 4/66; H01R 43/02; H01R 4/023

See application file for complete search history.

(56) References Cited

U.S. PATENT DOCUMENTS

| | | | | | |
|---|---|---|---|---|---|
| 4,860,938 | A * | 8/1989 | Clark | B23K 1/00 | 228/102 |
| 4,887,853 | A * | 12/1989 | Flowers | B23K 1/18 | 228/136 |
| 5,069,275 | A | 12/1991 | Suzuki et al. | | |
| 5,205,349 | A | 4/1993 | Nagao et al. | | |
| 5,487,685 | A * | 1/1996 | Stillback | F16B 37/061 | 439/801 |
| 6,708,756 | B2 * | 3/2004 | Parola | B23K 1/0012 | 165/178 |
| 2004/0238510 | A1 * | 12/2004 | Mielke | B23K 1/00 | 219/129 |
| 2007/0272660 | A1 * | 11/2007 | Wang | B23K 11/0053 | 219/93 |
| 2013/0313822 | A1 * | 11/2013 | Jones | B23K 1/0012 | 285/289.5 |

* cited by examiner

*Primary Examiner* — Brian Jennison

(74) *Attorney, Agent, or Firm* — Marla Johnston; Brooks Kushman P.C.

(57) ABSTRACT

A method of manufacturing a grounding connection is disclosed that comprises assembling a non-ferrous grounding connector to a non-ferrous part, and melting brazing material between the grounding connector and the part to secure the grounding connector to the part. The step of assembling the connector to the part may be performed by clinching the connector to the part. The ground connector may comprise a nut secured to the vehicle body by a clinch joint and a deposit of braze metal applied to the nut at the location of the clinch joint. Alternatively, the ground connector for a vehicle body may comprise a nut defining an opening for receiving a fastener and a deposit of brazing material attaching the nut to the vehicle body.

5 Claims, 1 Drawing Sheet

BRAZED GROUND TERMINAL FOR NON-FERROUS VEHICLE COMPONENTS

TECHNICAL FIELD

This disclosure relates to the concept of brazing ground terminals for aluminum and other non-ferrous parts of a vehicle.

BACKGROUND

Vehicle bodies may be manufactured with non-ferrous metals such as aluminum or magnesium. Many electrical vehicle components are connected to ground through the vehicle body. Attaching ground connectors to steel vehicle bodies is accomplished by simply welding the connectors to the steel bodies by resistance welding.

Ground wires for aluminum vehicle bodies are connected to expensive weld studs or weld nuts that are welded by resistance welding to the vehicle body. Welding weld studs or weld nuts to aluminum alloys may result in burn through at the location of the welds due to the difficulty in welding to aluminum. Welds of aluminum studs or nuts to aluminum parts results in welds that have reduced tensile and shear strength.

Aluminum used for vehicle body parts is heat treatable aluminum alloys commonly referred to a 6XXX aluminum that may be hardened by heating after forming to improve the strength of the material. Welding studs or nuts to heat treated surfaces may create a heat affected zone of the part that results in a loss of the tempering effect and localized reduction of the strength of the part.

The above problems and other problems are addressed by this disclosure as summarized below.

SUMMARY

According to one aspect of this disclosure, a method of manufacturing a grounding connection is disclosed that comprises assembling a non-ferrous grounding connector to a non-ferrous part, and melting brazing material between the grounding connector and the part to secure the grounding connector to the part.

According to other aspects of this disclosure as it relates to the above method, the step of assembling the connector to the part may be performed by clinching the connector to the part. The non-ferrous part may be a heat treated aluminum alloy, and the brazing material may have a melting point of between 700° and 900° F.

The grounding connector may include features that facilitate depositing the brazing material. In one embodiment, a plurality of feet may be formed of the brazing material that are melted during the melting step. In another embodiment, the grounding connector may have a plurality of sides that define a plurality of channels. The brazing material is melted to flow through the channels that extend from an outer surface of the grounding connector to a surface of the grounding connector that is attached to the part. In another embodiment, a braze washer may be inserted between the ground connector and the part to provide the brazing material that melts in the melting step.

The method of manufacturing the grounding connection may be automated and the melting step may be performed by feeding a wire electrode toward an area between the grounding connector and the part and supplying electrical current to melt the wire electrode. Alternatively, the step of melting the braze material may be performed by heating the braze material in a resistance welding operation.

In service operations, the melting step may be performed by heating the braze material with a torch.

This disclosure also relates to providing a ground connector for a vehicle body that comprises a nut secured to the vehicle body by a clinch joint and a deposit of braze metal applied to the nut at the location of the clinch joint. The nut and vehicle body may define an interstitial gap that is filled by the braze metal.

In another embodiment, a ground connector is provided for a vehicle body that comprises a nut defining an opening for receiving a fastener and a deposit of brazing material attaching the nut to the vehicle body.

According to other aspects of this disclosure as it relates to the ground connector, the opening may be a non-threaded opening and the fastener may be a self-tapping screw. The brazing material is an aluminum alloy having a melting point of between 700° and 900° F. The nut is an aluminum nut and the vehicle body may be an aluminum body formed of 6XXX series aluminum that was previously heat treated before the filing the interstitial gap with braze metal.

The above aspects of this disclosure and other aspects are described below with reference to the attached drawing figures.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
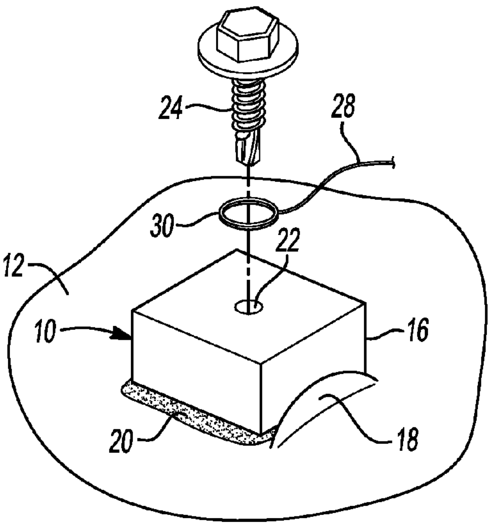
FIG. 1 is an exploded perspective view of a grounding connector clinched to a vehicle body and secured by a braze deposit that is shown with a wire having connection terminal and a screw.

Referring to FIG. 1, a ground connector 10 is shown attached to a vehicle body 12. The ground connector 10 includes a nut 16 that is connected by a clinch joint 18 to the vehicle body 12. A deposit of braze material 20 is melted to flow between the nut 16 and the vehicle body 12. The braze material 20 permanently connects the nut 16 to the vehicle body 12. The nut 16 includes a fastener receiving opening 22 that may be a non-threaded opening if a self-tapping screw 24 is used to connect a wire 28 having a terminal connector 30 to the nut 16. Alternatively, a threaded opening may be used with a conventional screw. Use of the self-tapping screw 24 and braze material 20 provide a good electrical connection between the wire 28 and the vehicle body 12.

The clinch joint 18 is formed by a clinching process. Clinching features (not shown) may be provided on the nut 16 to facilitate the clinching process.

Figure 2:
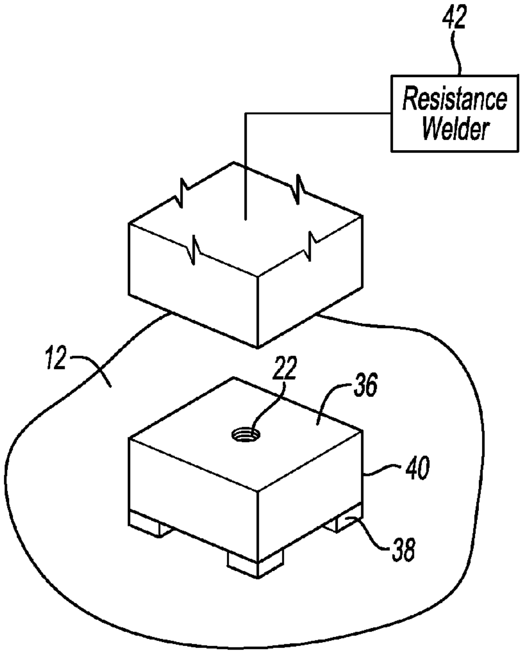
FIG. 2 is a perspective view of a grounding connector nut having braze material feet that are adapted to be melted to secure the nut to the vehicle body.

Referring to FIG. 2, an alternative embodiment of a nut 36 that may be used as a ground connector is shown. The nut 36 includes a plurality of braze material feet 38 at the corners 40 of the nut 36. The nut 36 includes an opening 22 and is shown attached to the vehicle body 12. the nut 36 may be attached to the vehicle body 12 in an automated process in which a resistance welder 42 engages the nut 36 causing current to flow through the braze material feet 38 and melt into the interstitial space between the nut 36 and the vehicle body 12.

Figure 3:
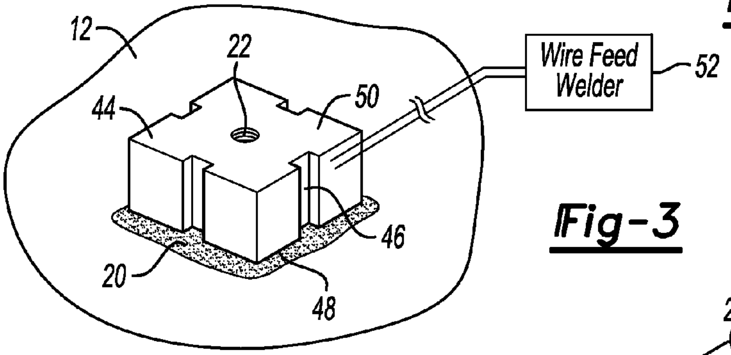
FIG. 3 is a perspective view of a grounding connector nut having channels formed in the nut into which braze material is melted to flow between the nut and the vehicle body.

Referring to FIG. 3, another alternative embodiment of a nut 44 that may be used to form a ground connector to allow grounding to the vehicle body 12. The nut 44 includes a plurality of channels 46 that are provided to facilitate the flow of braze material 20 between an attachment surface 48 and the vehicle body 12. The channels 46 extend to the attachment surface 48 from an outer surface 50 of the nut 44. Braze material is supplied to the channels 48 by a wire feed welder 52 to the channel that melts and then flows through the channels 46 to the interstitial space between the nut 44 and the vehicle body 12.

Figure 4:
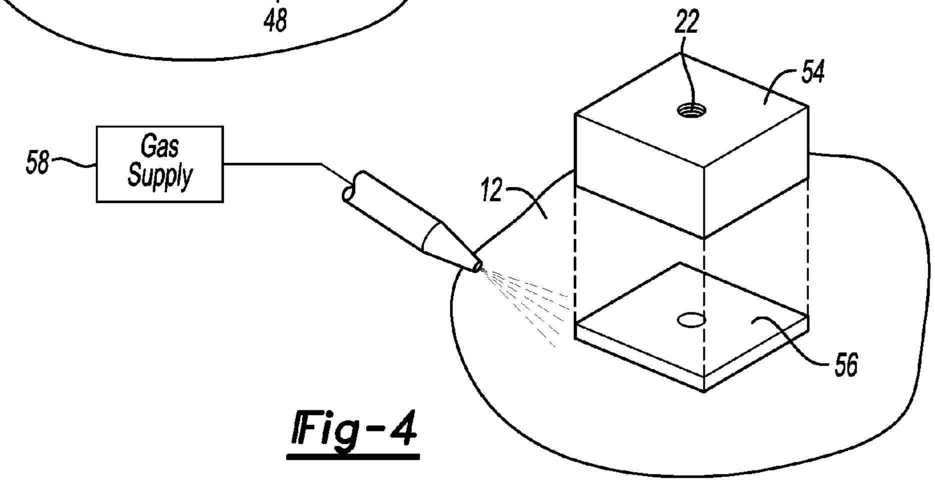
FIG. 4 is an exploded perspective view of a grounding connector nut and a braze washer assembled to the vehicle body before melting the braze washer to secure the nut to the vehicle body.

Referring to FIG. 4, another embodiment is shown that may be more suitable for service operations where it is necessary to connect a wire to a ground connector. A nut 54 having a fastener receiving opening 22 is shown exploded away from a washer 56 that is formed of braze material. The washer 56 may be a relatively thin foil section of braze material that is placed between the nut 54 and the vehicle body 12. A gas torch 58 is shown being directed toward the washer 56 of braze material that is used to melt the washer and thereby connector the nut 54 to the vehicle body 12.

The vehicle body 12 is an aluminum vehicle body made up of 6XXX aluminum that has been formed and then tempered to increase the strength of the body 12.

The braze material is preferably an aluminum/nickel/silicon braze material having a melting point of between 700° and 900° F. The melting point of the braze material must be substantially lower than the heat treating temperature used to treat and strengthen the vehicle body 12. The vehicle body is generally heat treated for a predetermined period of time at a temperature of approximately 1000° F. After heat treating, the six XXX aluminum alloy is substantially strengthened. By attaching the nut with braze material having a melting point of between 700° and 900° F., the strength of the vehicle body is not adversely affected and the heat effective zone of any vehicle component part to which the nut is attached is limited to reduce the loss of tempering and localized reduction of the strength of the part. The brazing temperature of between 700° and 900° F. does not present any risk that attachment of the nut will result in burn through of the component parts of the vehicle body.

It should be understood that the automated manufacturing processes may be automated by using a wire feed welder or a resistance welder. The above embodiment of using a clinch joint connection may be completed by applying brazing material with either a resistance welder or wire feed welder. In general, the process is used to melt the brazing material may be interchanged to work with any of the nuts used to provide the grounding connector.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A method of manufacturing a grounding connector including a non-ferrous nut, a screw, and a wire terminal to a part comprising:

assembling the nut to a non-ferrous part;

melting a brazing material between the nut and the part to secure the grounding connector to the part; and connecting the screw, and wire terminal to the nut, wherein the nut has a plurality of sides extending between an attachment surface and an outer surface of the nut that define a plurality of channels, respectively, and wherein the brazing material is melted to flow through the channels.

2. The method of claim 1 wherein the step of assembling the connector to the part is performed by clinching the nut to the part.

3. The method of claim 1 wherein the non-ferrous part is a heat-treated aluminum alloy, and the brazing material has a melting point of between 700° and 900° F.

4. The method of claim 1 wherein the nut further includes a plurality of feet provided on the nut that are formed of the brazing material that melt during the melting step.

5. The method of claim 1 further comprising a braze washer inserted between the ground connector and the part, and wherein the braze washer provides the brazing material that melts in the melting step.

* * * * *